May 4, 1965  A. LENKEY ETAL  3,181,574
DISPENSING HEAD FOR A FLUID FRACTION COLLECTOR
Filed Feb. 23, 1962  3 Sheets-Sheet 1

INVENTORS
Andrew Lenkey
Robert J. Ehret
BY
ATTORNEYS.

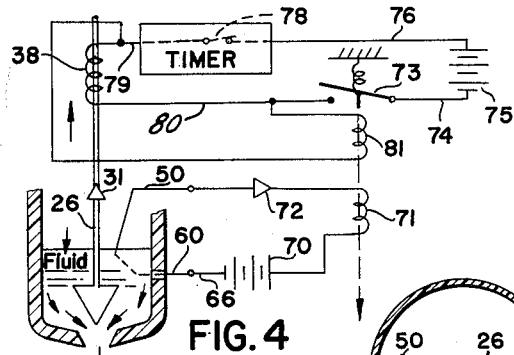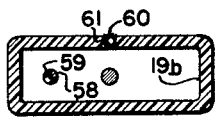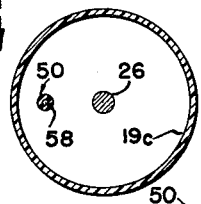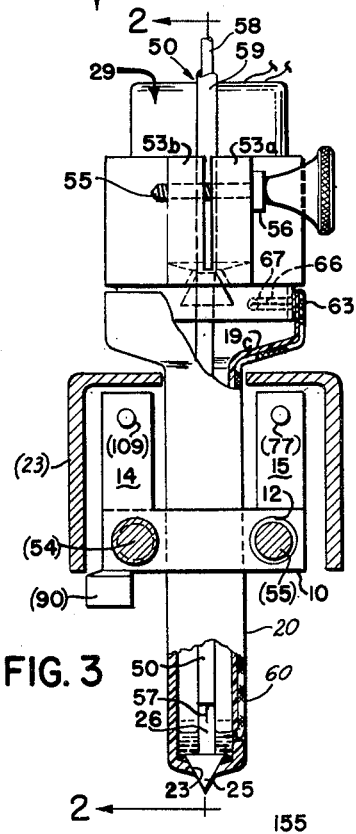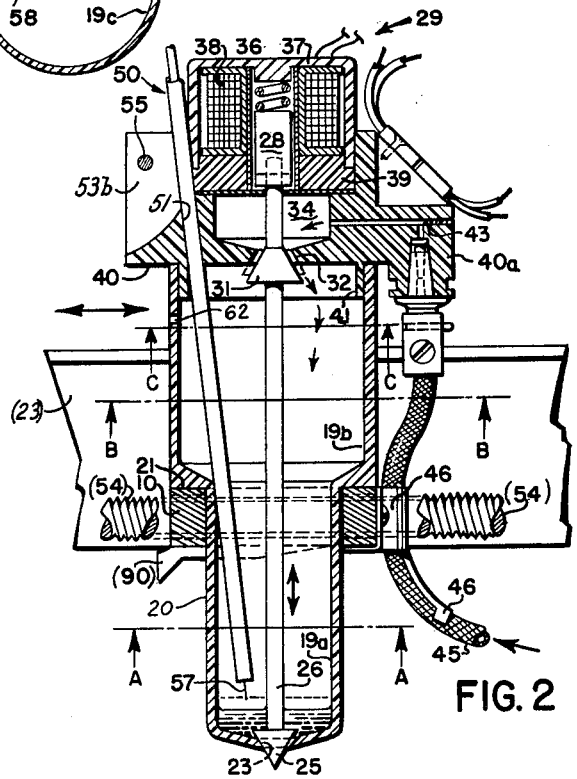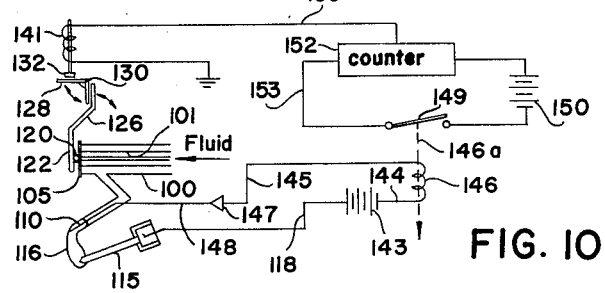

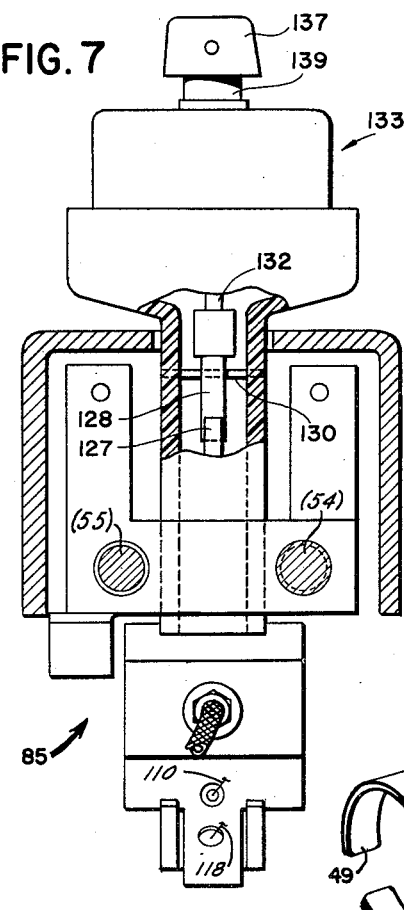
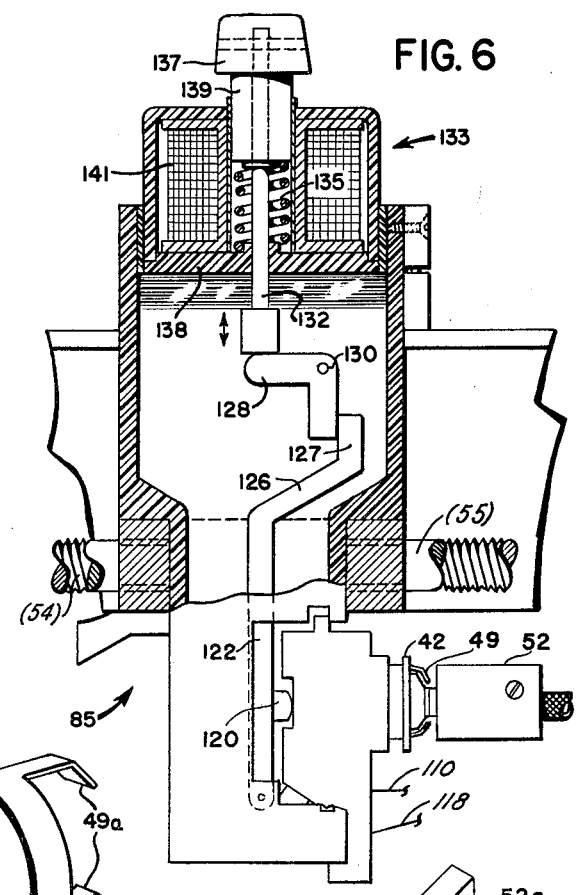
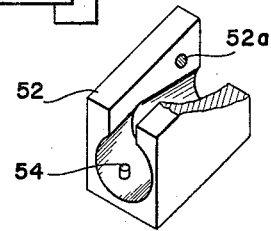
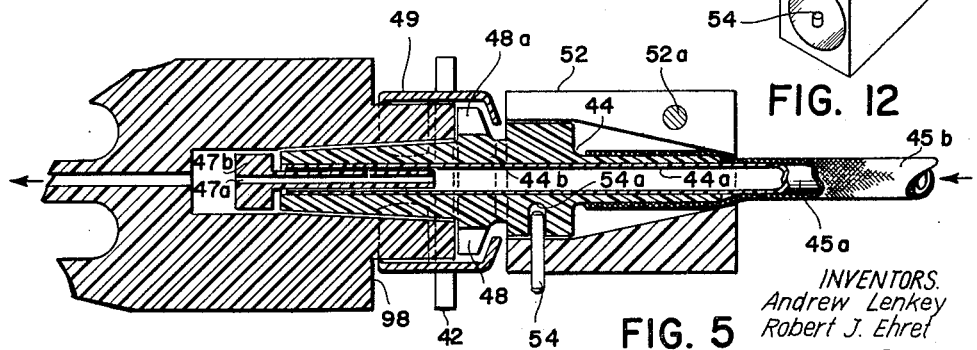

United States Patent Office 3,181,574
Patented May 4, 1965

3,181,574
DISPENSING HEAD FOR A FLUID
FRACTION COLLECTOR
Andrew Lenkey, Menlo Park, and Robert J. Ehret, Los Altos, Calif., assignors to Beckman Instruments, Inc., a corporation of California
Filed Feb. 23, 1962, Ser. No. 175,252
16 Claims. (Cl. 141—130)

This invention relates generally to fluid fraction collectors and more particularly to dispensing heads for fluid fraction collectors and mountings therefor.

Fraction collectors are generally used to dispense controlled small volumes of fluid samples into each of a series of test tubes disposed in an array whereby an analysis of either the sample or collection pattern can be obtained. The measuring of the amount or number of units of fluid delivered has generally been by one of three methods, viz., counting of drops, measuring of volume, and by supplying liquid for measured time periods.

Where the flow rate of fluid to the fraction collector is very small, discrete drops of fluid are dispensed by a dispensing head to the test tubes and counted as they are delivered. Where a higher flow rate of fluid to the fraction collector is to be encountered measured volumes thereof are accumulated for each test tube and then delivered. It is sometimes desirable, however, to collect fluid for predetermined periods of time so that the amount thereof collected for such fixed periods can be examined for various periods during the day. In such an instance, collecting fluids by the time method is utilized.

It is a general object of the present invention to provide improved dispensing heads for fluid fraction collector apparatus.

It is another object of the present invention to provide interchangeable dispensing heads for fluid fraction collectors.

It is still another object of the present invention to provide a fraction collector having a head mount accommodating a set of interchangeable heads so as to provide a versatile fraction collector apparatus.

It is a further object of the present invention to provide a fraction collector dispensing head having extremely accurate means for determining the quantity of fluid delivered.

Where the measured volume method of collecting fractions is employed, it is to be appreciated that during the time the fraction is draining, the continuing influx of fluid to the collector adds an unmeasured amount to the volume being dispensed. This results in delivery of inaccurate volumes of liquid.

Therefore, it is another object of the present invention to provide a fraction dispensing head including means for arresting the influx of fluid to the head during the time the head is draining.

Other objects of the invention will be pointed out in the following description and claims and illustrated in the accompanying drawings.

In the drawings:

FIGURE 2 is a vertical half-section of a measured volume dispensing head.

FIGURES 2a–2c are plan sections of FIGURE 2 at lines A—A; B—B; and C—C respectively.

FIGURE 3 is a view of the left side of FIGURE 2, partially broken away.

FIGURE 4 schematically shows a control circuit for operating the measured volume dispensing head of FIGURE 2.

FIGURE 5 is an enlarged view of a suitable hose coupling structure for the heads.

FIGURE 6 is a vertical half-section of a drop counting head.

FIGURE 7 is a view of the right side of FIGURE 6.

Figure 8:
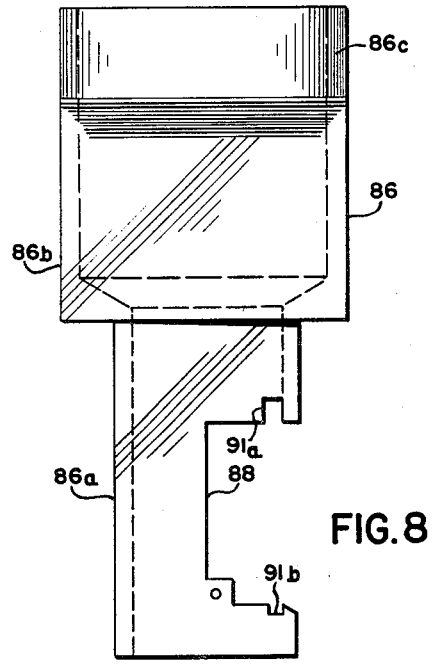

FIGURE 8 is a side elevation view of the body of the FIGURE 6 head.

Figure 9:
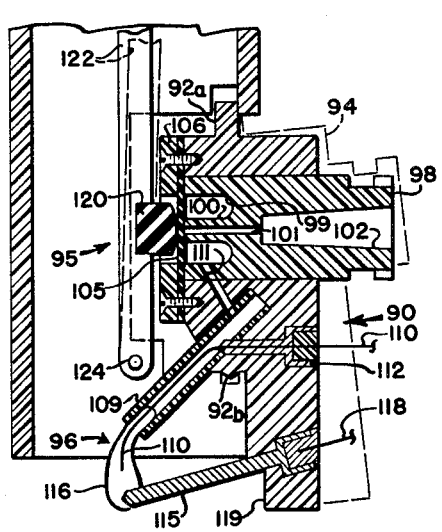

FIGURE 9 is an enlarged vertical half-section of a portion of FIGURE 6.

FIGURE 10 schematically shows a control circuit for the drop counting head.

FIGURES 11 and 12 are perspective views of a retaining ring and a clamp, both shown in FIGURE 5.

Briefly stated, in accordance with the invention there is provided a traveling bed designed to interchangeably receive one or the other of two or more fraction dispensing heads. In accordance with the present invention the heads include a pair of conductors which are arranged to be electrically coupled upon mutual contact with the fluid being collected. The electrical coupling of the two conductors is sensed to control valving of the fluid to the test tube located directly beneath the dispensing head.

Figure 1:
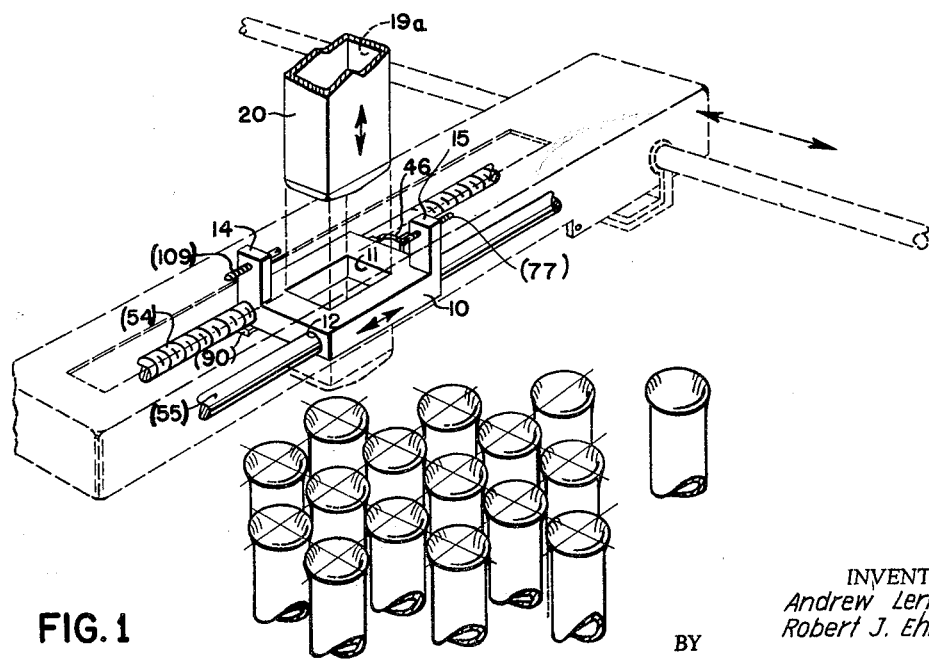
FIGURE 1 is an enlarged perspective view of the traveling mount for interchanging the dispensing heads.

A suitable fraction collector for utilizing the traveling bed shown in FIGURE 1 is described in copending patent application, Serial No. 151,833, filed November 13, 1961, assigned to the above assignee. Briefly, the fraction collector referred to is of the type wherein a dispensing unit is arranged to be advanced step-wise along a column of test tubes until it has serviced the last test tube in the column, at which time the dispensing unit is laterally and forwardly moved to the start of an adjacent column where it again moves step-wise through the test tubes of the next column. The step-wise movements of the dispensing unit therefore progress very much as a normal reading scanning movement.

The dispensing unit in the above referenced patent application is under control of a lead screw (54) as shown herein in FIGURE 1. In the present invention, and with particular reference to the components shown in FIGURE 1, certain reference numerals appear in parentheses and these reference numerals are to be understood to refer to substantially corresponding components found in the above identified patent application. However, it is not believed that reference to the foregoing patent application will be necessary for a complete understanding of the present invention inasmuch as sufficient descriptive material relative thereto will be incorporated herein as the description proceeds below.

Referring to FIGURE 1 there is shown a bed 10 of substantially rectangular construction having a rectangular hole 11 formed vertically therethrough. Bed 10 is supported upon a lead screw (54) and a support rod (55) both of which pass lengthwise through the sides of bed 10. Lead screw (54) coacts with threads (not shown) formed in bed 10 so that rotation of screw (54) will move bed 10 in a direction dependent upon the direction of rotation thereof. A plastic sleeve or bushing 12 is interposed between rod (55) and the interior cylindrical surface of a hole bored through bed 10. Bed 10 is further formed with a pair of upright members 14 and 15 diagonally oriented on the top surface of bed 10. Each of members 14 and 15 carries a screw (109), (77) respectively disposed substantially parallel to the direction of movement of bed 10 for operating limit switches. Thus screw (109) is arranged to close a first limit switch which reverses the direction of movement of bed 10 while screw (77) performs a similar function for movement in the opposite direction. Disposed directly in line with opening 11 and shown above the opening in phantom lines is the bottom portion of a measured volume fraction dispensing head 20 which can be dropped directly into opening 11 until it rests upon a shoulder 21 as shown more clearly in FIGURE 2. In FIGURE 1 shown directly below bed 10 and integral with it is a catch member (90) which operates a lever arm in the above referenced patent application to provide lateral movement of bed 10 and its associated structure to an adjacent column of test tubes.

One type of fraction dispensing head is shown in FIGURES 2, 3 and 4. In FIGURE 2 the measured volume dispensing head 20 for delivering fluid includes a bucket 19 having a lower portion 19a of substantially rectangular cross-section as shown best in FIGURE 2a. Bucket 19 is of one piece construction and extends vertically to provide a larger rectangular shaped upper portion 19b as shown best in FIGURE 2b. Bucket 19 also includes a circular bowl-shaped top portion 19c shown best in FIGURE 2c. On the exterior of bucket 19 between portion 19a and 19b is the flat shoulder surface 21. Shoulder surface 21 rests upon the upper surface of bed 10 when bucket 19 is dropped into opening 11 thereby making the dispensing head easily removable from bed 10. Finally, the bottom of bucket 19 is provided with a discharge outlet 23 shaped to snugly receive a valve 25 therein.

Valve 25 is mounted upon a valve stem 26 axially disposed vertically through the center of bucket 19 and formed integrally with the armature 28 of a solenoid 29. At the upper end of valve stem 26 is a conically shaped valve 31, disposed to face away from valve 25 to control an interconnecting port 32 between the interior of bucket 19 and a fluid accumulator chamber 34. As shown in FIGURE 2, it can be seen that downward movement of valve stem 26 serves to close outlet 23 while opening port 32 to permit fluid to pass from accumulator chamber 34 into the interior of bucket 19. When stem 26 is moved upwardly by solenoid 29, port 32 is closed and outlet 23 is opened to drain fluid from bucket 19, thereby preventing further influx of fluid into bucket 19 during drainage thereof. A vent 62 permits draining without forming a back suction. Valve stem 26 is biased downwardly into a closed position by a spring 36 interposed between the upper end of armature 28 and a cap 37 of solenoid 29. Solenoid 29 further includes a coil 38 and a base plate 39 machined about its circumference to fit within the opened bottom of cap 37. A support plate 35 forms the top of chamber 34 and also supports solenoid 29.

Outlet 23 is normally closed to accumulate fluid in bucket 19 as it enters via normally open port 32. During dumping of fluid from bucket 19, however, upward movement of stem 26 serves to open outlet 23 and close port 32. While port 32 is closed, fluid temporarily accumulates in chamber 34 and is, therefore, not added to the amount being delivered via outlet 23. At the same time, virtually no back pressure is built up in the feed line.

Accumulator chamber 34 is formed as a hollowed out or drilled hole in a unitary closure structure 40 provided with an annular sleeve 41 which is snugly received by the upper open end of the bowl-shaped top portion 19c. Unitary closure structure 40 as previously noted includes an interconnecting port 32 of conical shape conforming to the outer shape of valve 31. A drilled passageway 43, plugged at its outer end, communicates with chamber 34 and links it with a source of fluid (not shown) being fed to enter via a hose 45. Hose 45 is held for convenience by a bracket 46 screwed to the underside of bed 10 and disposed vertically at the back thereof. In order to connect the end of hose 45 to unitary closure structure 40 a suitable fluid coupling is provided which is more fully shown and described with respect to FIGURES 5, 11 and 12.

In order to couple the hose 45 to unitary closure structure 40, the latter is provided with a cylindrically shaped hose receiving portion 40a. While FIGURE 5 shows a suitable coupling arrangement for connecting a hose to a drop counting head as shown in FIGURES 6 and 7 and in enlarged detail in FIGURE 9, it is to be understood that the coupling is effected in the same manner for the volume delivering head 20 described in FIGURE 2. Therefore, for the purposes of this description, the hose receiving portion 40a of the volume head 20 is considered the equivalent of the hose receiving portion of member 98 of the drop counting head shown in FIGURE 9 (described below). Accordingly, in FIGURE 5 hose receiving portion 40a or member 98, as the case may be, is provided with a flange 42 of substantially circular formation and having a pair of notches therein to pass the ears 49a of a resilient retaining collar 49 shown in FIGURE 11. Retaining collar 49 fits around an annular groove formed between flange 42 and member 98. Hose 45 is shown as a multi-layered construction having an inner tube 45a of a tough plastic material having some resiliency and an outer sheath or covering 45b. The end of hose 45 is provided with a bored hose end structure 44 which includes a sleeve-like rear portion 44a. Sleeve portion 44a is disposed between sheath 45b and tube 45a. The left end of structure 44 is formed into a nozzle 44b of tapered exterior surface which receives a slightly conically shaped plug 47 having a bore 47a drilled therethrough. In order to retain hose 45 to nozzle 44b, plug 47 is wedged into the bore thereof so as to pinch the tubing 45a therebetween. Plug 47 includes an enlarged head portion 47b forming substantially a continuation of the exterior surface of nozzle portion 44b. Formed integrally with the exterior surface of nozzle 44b is a circular flange 48 having a pair of bayonet notches 44a cut therein. As thus arranged by aligning notches 48a with ears 49a of retaining collar 49, member 44 can be coupled to hose receiving portion 40a or member 98 as shown in FIGURE 5 by insertion, followed by half turn, i.e., bayonet fashion. A clamp as shown in FIGURE 12 is provided around sleeve 44a and sheath 45b and taken up on hose 45 in order to provide a more manageable coupling. Clamp 52 includes a pin 54 inserted through the bottom thereof to coact with a hole 54a drilled into an enlarged portion encircling member 44. In this manner, rotation of clamp 52 directly rotates member 44. A screw 52a is also provided to compress the sides of clamp 52 so as to retain sheath 45b in place.

As shown best in FIGURE 2, an ullage probe 50 extends into the interior of bucket 19 through a substantially vertical hole 51 drilled downwardly through the top of closure structure 40 and emerging interiorly of sleeve 41. In order to accommodate the upper end of probe 50, a circular groove is formed in the solenoid base plate 39 and in cap 37 in line with the righthand edge of hole 51. As shown in FIGURE 3, closure structure 40 includes a pair of leaves 53 which are arranged to be squeezed together so as to pinch probe 50 therebetween. In order to apply such compressive force, a knurled adjusting screw 55 is threadedly engaged by leaf 53b while extending freely through leaf 53a. Adjusting screw 55 is provided with a collar 56 whereby screwing into leaf 53b will compress it upon leaf 53a thereby holding probe 50 fixed tightly in position.

Probe 50 is formed to include a hair-like platinum wire 57 soldered to the end of a metal rod 58 sheathed within an insulative plastic tube 59. As thus arranged, conductor 57 can be disposed vertically within bucket 19 through a wide range of displacements. Shorter rods can be used with greater volumes so as to reduce the outward protrusion of rod 50, if desired.

As shown in FIGURE 3, a second conductor 60 extends through a sealed hole near the bottom of bucket 19 into the interior thereof. Conductor 60 lies in a vertical groove 61 running upwardly along a broad side of bucket 19. Conductor 60 is covered by suitable insulation material and at the upper edge of top portion 19c, at 63, it disposed over the edge thereof to terminate interiorly of portion 19c with the insulation removed thereby forming a contact point. Closure structure 40 is also provided with a cooperating contact point for contact point 63 leading via a conductor 66 first through a laterally drilled hole 67 and then exteriorly of structure 40 whereby lead 66 can be connected to a power supply such as a battery 70 as shown in FIGURE 4 in circuit with a solenoid 71. The circuit of solenoid 71 is completed through a high gain amplifier 72 of suitable construction having a gain of several thousand connected to probe 50.

A schematic electrical arrangement for operating the measured volume dispensing head is shown in FIGURE 4, and in addition to the circuit just described which links probe 50 with conductor 60 when fluid is mutually in contact therewith (thereby operating solenoid 71), the arrangement of FIGURE 4 includes a switch 73 biased normally open and arranged to be closed by energizing solenoid 71. Closure of switch 73 completes a circuit through a conductor 74, a power supply shown as a battery 75, the positive terminal of which is connected via a conductor 76 to a timer 77 of suitable construction including a switch 78 which is normally closed but which opens after a predetermined period. Timer 77 is connected to a lead 79 coupled to the coil 38 of solenoid 29 which lifts valve stem 26, return being made through a conductor 80. A holding coil 81 to operate switch 73 is arranged in parallel with coil 38 thereby maintaining the connection between conductor 74 and conductor 80 until timer switch 78 opens. Accordingly, when fluid has risen within bucket 19 to a level mutually contacting probe 50 and conductor 60, solenoid 71 is energized thereby closing switch 73. As switch 73 closes, current flows in the coil 38 of solenoid 29 thereby raising valve 25 to discharge the fluid from bucket 19 and at the same time sealing the bottom of chamber 34.

With the closure of switch 73, holding coil 81 is energized to maintain switch 73 closed after the fluid level has dropped below the level of probe 50 thereby allowing bucket 19 to drain free. During the time solenoid 29 is energized timer 77 is activated so that after a predetermined period, switch 78 is opened, thereby deenergizing holding coil 81 to release switch 73 to its normally open position. With the opening of switch 73, valve 25 closes under the urging of spring 36 thereby accumulating additional fluid within bucket 19 and releasing any fluid which accumulated in chamber 34 during the drainage period.

Thus it can be seen from the foregoing that an extremely accurate measured volume of fluid can be dispensed and can be varied by a simple adjustment raising or lowering probe 50.

When it is desired to change from the measured volume method of operation to a drop counting method, the measured volume dispensing head 20 can be removed by lifting it upwardly out of opening 11 and replacing it with a drop counting head 85 best shown in FIGURES 6 and 7.

Drop counter dispensing head 85 includes a body member 86 shown in FIGURE 8 having a lower and upper portion 86a and 86b respectively each of generally rectangular cross section. Body member 86 is formed with a bowl shaped top portion 86c as shown in FIGURES 7 and 8. The sides of lower portion 86a of body member 86 have been cut away to provide a recess 88 for receiving an insertable drop counting housing member 90 shown in detail in FIGURE 9. Recess 88 is formed with a pair of notches 91a, 91b respectively located top and bottom thereof so as to cooperate with a pair of lateral ridges 92a and 92b respectively, formed top and bottom across housing 90. In this manner, housing 90 can be easily slipped in and out of body member 86 by raising housing 90 sufficiently to permit ridge 92b to clear recess 91b and pivoting the bottom of housing 90 forwardly to a position as shown by the phantom lines 94 in FIGURE 9. Thus, with housing 90 removed from body member 86, the latter can be dropped into bed 10 followed by insertion of housing 90 into recess 88.

As best shown in FIGURE 9, housing 90 includes a fluid delivering control valve 95 and a drop counting arrangement 96. The control valve 95 includes a hose connection plug 98 drilled to receive a suitable hose coupling nozzle 44b (FIGURE 5) such as described with respect to FIGURE 5. The left end of plug 98 is formed with a substantially cylindrical recess 99 with a drilled pedestal 100 disposed coaxially therewith. The drilled hole 101 through the center of pedestal 100 communicates with the nozzle receiving portion 102 of plug 98. Thus, fluid being fed to the fraction collector enters via receiving portion 102 and hole 101. Across the face of recess 99 and covering hole 101 is disposed a resilient diaphragm 105 of a suitable material, for example such as Teflon (R) (i.e. a tetrafluoroethylene polymer) held in place by a retaining ring 106 screwed to the left side of housing 90.

In order to direct each drop of fluid to mutually contact a pair of electrodes, there is provided an angularly disposed delivery tube 109 imbedded in housing 90 and in fluid communication with the lower side of recess 99 by a channel 111 extending through the lower side wall of recess 99 and through housing 90 into tube 109. A platinum electrical lead 110 is located within the bore of tube 109 and supported therein by a metallic pin 112 having a cup-shaped head filled with a suitable solder or epoxy material. A second pin 115 extends to the left so as to dispose its tip end directly beneath the end of conductor 110 and spaced therefrom so that a discrete drop of fluid 116 can mutually contact conductor 110 and pin 115. As with pin 112, pin 115 includes a solder filled cup-shaped head to anchor an electrical lead 118. Pin 115 is supported from a depending portion 119 of housing 90 and disposed between the two side walls of body member 86.

In order to control hole 101 in pedestal 100, a resilient knob 120 of a suitable material such as rubber is mounted upon a valve control lever arm 122 pivoted about a pin 124 extending between the side walls of body member 86. In order to actuate valve control lever arm 122, its upper end is provided with a dog-leg 126 having a vertical extension 127 which engages a bell crank 128 arranged to pivot about a pin 130. Bell crank 128 is arranged to be driven counter clockwise by the downward movement of an armature 132 of a push type solenoid 133. Solenoid 133 includes a spring 135 between an upper cap portion 137 and a bottom cap 138 of solenoid 135 biasing armature 132 upwardly away from bell crank 128. Upper cap portion 137 retains a soft iron armature slug 139 so that energizing the solenoid coil 141 causes slug 139 to move downwardly therethrough. Accordingly, as coil 141 is energized, armature 132 is moved downwardly rotating bell crank 128 counter clockwise so as to move arm 122 clockwise thereby pushing knob 120 against diaphragm 105 to close off the left end of opening 101. Closure of hole 101 by diaphragm 105 immediately locks all fluid present in tube 109 by creating a vacuum which overcomes gravitational flow of fluid therethrough. On the other hand when knob 120 is free to move away from the back of diaphragm 105, fluid emerges in discrete drops from a path defined by opening 101, recess 99, channel 111 and tube 109 so that each discrete drop 116 couples leads 110 and 115 to be sensed by a suitable circuit.

Referring to FIGURE 10, a circuit for counting each discrete drop is shown wherein after a predetermined number of drops have been counted the valve 95 is closed to interrupt the feeding of such drops of fluid.

The circuit includes pin 115, lead 118 connected to the positive side of a power supply such as a battery 143. Another lead 144 from the negative terminal connects via a solenoid coil 146 and a lead 145 to conductor 110 via a high gain amplifier 147 of suitable construction having a gain of several thousand and a lead 148. The solenoid armature 146a of coil 146 operates a switch 149 closed during energization of coil 146. This closure completes a circuit from switch 149 through a power supply such as a battery 150, to a pre-set or predetermined counter 152, and return via a lead 153 and switch 149.

Counter 152 is of conventional design wherein each pulse received advances it one unit until a predetermined number of units have been counted, at which time an output pulse of predetermined duration is generated. Here, the output pulse appears on a lead 155 connected to energize coil 141 thereby pushing armature 132 down to close passageway 101. The temporary closure of passageway 101 affords time enough to relocate head 85 to its next dispensing location.

Therefore, from the above description it can be seen that a set of heads has been provided together with a mount for interchanging from one to the other. Thus, a highly versatile apparatus is provided.

Therefore, while there have been shown and described and pointed out the fundamental novel features of the invention as applied to the preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

We claim:

1. In a fraction collector wherein predetermined quantities of fluid are delivered to each of a number of test tubes disposed in an array, dispensing apparatus comprising a bed movable with respect to said array to be positionable above said test tubes from one to the next, said bed including means serving to readily releasably receive a dispensing unit, said dispensing unit including electro-mechanical means for establishing said predetermined quantities, the last named means including valve means controlling delivery of said quantities, a pair of conductors controlling said electro-mechanical means, said conductors being disposed to be electrically coupled by said fluid to immediately actuate said valve means to effect said control.

2. In a fraction collector wherein predetermined quantities of fluid are delivered to each of a number of test tubes disposed in a stationary array, dispensing apparatus comprising a bed movable with respect to said array to be positionable above said test tubes from one to the next, said bed including means serving to readily releasably receive a dispensing unit, said dispensing unit including electro-mechanical means for establishing said predetermined quantities, the last named means including valve means controlling delivery of said quantities, a pair of conductors controlling said electro-mechanical means, said conductors being disposed to be electrically coupled through said fluid by mutual contact therewith to immediately actuate said valve means to effect said control.

3. In a fraction collector wherein predetermined quantities of fluid are delivered to each of a number of test tubes disposed in an array, having a counter, and further having a dispensing unit including electro-mechanical means for establishing said predetermined quantities, fluid delivery apparatus comprising a pair of conductors operatively controlling said electro-mechanical means, valve means serving to break a fluid stream into discrete drops thereof, means directing said discrete drops of fluid into mutual contact with said conductors to effect a discrete coupling for each drop, and circuit means connected to advance said counter in response to each said coupling between said conductors whereby said drops can be counted.

4. A dispensing unit as in claim 3 wherein said valve means is connected to respond to attainment of a predetermined count by said counter to temporarily interrupt delivery of said fluid, said valve means including means forming a vacuum serving to withhold further delivery by said drops immediately responsive to actuation of said valve means.

5. A fluid dispensing unit as in claim 2 further including reservoir means having an outlet controlled by said valve means, a fluid receiving chamber upstream of said reservoir and disposed whereby fluid being supplied to the dispensing unit to be delivered can be temporarily accumulated during delivery of a measured volume of fluid, said conductors being disposed in predetermined spaced apart relation with respect to each other within said reservoir means to provide an impedance variation therebetween upon mutual contact with said fluid, and a solenoid coupled to operate said valve means and electrically connected to respond to said variation and deliver a measured volume of said fluid via said outlet.

6. A fluid dispensing unit as in claim 5 wherein said conductors are adjustably positionable with respect to each other to vary said spaced relation thereby serving to determine the extent of said measured volume of fluid.

7. A fluid dispensing unit of the type suitable for use in fluid fraction collectors having means for positioning a dispensing unit into delivery alignment with each of a plurality of test tubes arrayed to receive fluid dispensed thereto, the last named means including a movable bed formed with an upwardly extending hole therethrough, said fluid dispensing unit comprising a housing, the exterior of said housing being formed to be snugly received in and readily removable from said hole to be carried by said bed, said housing carrying delivery means for directing a supply of fluid in a path to said test tubes, a valve controlling movement of fluid along said path, and means controlling said valve including a pair of conductors disposed to be electrically coupled by said fluid whereby the quantity of fluid to be delivered to each test tube is controlled by said coupling.

8. A fluid dispensing unit as in claim 7 further including means for converting said fluid movement along said path into discrete drops thereof and for positively withholding a formed fluid drop from delivery during repositioning of said dispensing unit with respect to said test tubes.

9. Fluid dispensing apparatus of the type suitable for use in a fluid fraction collector having a plurality of test tubes arrayed to receive fluid dispensed thereto, and wherein means are provided for positioning a dispensing unit for delivery of the fluid to said test tubes, said apparatus comprising a supporting bed for removably receiving a dispensing unit, the bed being movable in accordance with the positioning means, and a dispensing unit comprising, in combination, conduit means coupled to a source of fluid and including a discharge end for delivering said fluid to said test tubes, circuit means determining the quantity of fluid delivered to each test tube, electro-mechanical control means responsive to said circuit means for starting and stopping delivery of said fluid, said circuit means including a pair of spaced electrical conductors disposed in open circuit relation, said conductors being oriented with respect to said conduit means to be electrically coupled by mutual contact with said fluid to effect said determination.

10. Fluid dispensing apparatus as in claim 9 wherein said electro-mechanical control means is disposed upstream of said discharge end and is constructed and arranged with respect to said conduit means to generate a flow of said fluid in discrete drops thereof, said conduit means being dimensioned to provide vacuum means serving momentarily to positively withhold delivery of a fluid drop traveling between said electro-mechanical control means and said discharge end to permit repositioning of said unit.

11. Fluid dispensing apparatus as in claim 9 wherein said conduit means includes a reservoir having a controlled outlet port therein, whereby measured volumes of fluid can be dispensed therethrough.

12. Fluid dispensing apparatus of the type suitable for use in a fluid fraction collector having a plurality of test tubes arrayed to receive fluid dispensed thereto, means for positioning a dispensing unit for delivery of fluid to said test tubes, said apparatus comprising a supporting bed carried by said positioning means and formed for removably receiving a dispensing unit, the bed being movable in accordance with the positioning means, a dispensing unit comprising in combination container means coupled to a source of fluid for delivering same to said test tubes, said container means including an upper and lower chamber and a port inter-connecting said chambers, said upper chamber further including a fluid inlet coupled to said fluid source, said lower chamber having an outlet for delivering fluid to said test tubes, and valve means controlling said port and said outlet respectively, said valve means being selectively actuable to simultaneously close said outlet while opening said port to accumulate a measured volume of fluid in said lower chamber or open said outlet while closing said port to accumulate fluid in the upper chamber during delivery of fluid from the lower chamber whereby fluid flow into the upper chamber remains uninterrupted during delivery from said lower chamber.

13. Fluid dispensing apparatus as in claim 12 further including electrical means controlling said valve means to selectively accumulate or deliver said volume, said electrical means including a pair of spaced electrical conductors normally disposed in open circuit relation, said conductors being oriented to be electrically coupled by mutual contact with said fluid to effect said delivery, said electrical means being coupled in circuit with said conductors to immediately actuate said valve means to commence delivery of said fluid.

14. Fluid dispensing apparatus as defined in claim 12 wherein said valve means includes a single solenoid operable between two positions to either open said outlet and close said port to deliver a measured volume of fluid from the lower chamber while accumulating fluid momentarily in said upper chamber, or to close said outlet and open said port to accumulate said measured volume in said lower chamber.

15. In a fraction collector wherein predetermined quantities of fluid are delivered to each of a number of test tubes disposed in an array, and having a dispensing unit including electromechanical means for establishing said predetermined quantities, fluid delivery apparatus including valve means serving to break a fluid stream into discrete drops thereof, said valve means including a seat member having a passage for passing fluid therethrough for delivery to said test tubes, said seat member having one end formed with an annular recess, an axially drilled pedestal disposed coaxially of said recess and in fluid communicaiton with the passage, a resilient diaphragm disposed transversely of said pedestal and covering said recess in yielding contact with said pedestal to close said passage, and a delivery tube leading from said recess to deliver discrete drops of fluid.

16. Fraction collecting apparatus as defined in claim 15 further including means serving to press said diaphragm against said pedestal to momentarily close same against fluid pressure to interrupt delivery of fluid and permit said dispensing unit to be repositioned with respect to another of said test tubes.

References Cited by the Examiner
UNITED STATES PATENTS

| 2,380,884 | 7/45 | Von Stoeser et al. | 222—64 |
| 2,867,354 | 1/59 | Tanzola et al. | 222—64 |
| 2,887,255 | 5/59 | Bauerlein et al. | 222—453 |
| 3,004,567 | 10/61 | Snow et al. | 141—130 |

FOREIGN PATENTS 728,725  4/55  Great Britain.

LAVERNE D. GEIGER, *Primary Examiner.*

LOUIS J. DEMBO, *Examiner.*